US006824629B2

(12) United States Patent
DiFabio et al.

(10) Patent No.: US 6,824,629 B2
(45) Date of Patent: Nov. 30, 2004

(54) METHOD FOR APPLYING TWIST-TIES TO FLEXIBLE PACKAGES

(75) Inventors: Nicholas DiFabio, Schwenksville, PA (US); John Hall, Souderton, PA (US)

(73) Assignee: Fres-co System USA, Inc., Telford, PA (US)

( * ) Notice: Subject to any disclaimer, the term of this patent is extended or adjusted under 35 U.S.C. 154(b) by 72 days.

(21) Appl. No.: 10/271,178

(22) Filed: Oct. 15, 2002

(65) Prior Publication Data

US 2003/0037865 A1 Feb. 27, 2003

Related U.S. Application Data

(62) Division of application No. 09/734,121, filed on Dec. 11, 2000, now Pat. No. 6,453,967.

(51) Int. Cl.[7] .................................................. B32B 31/12

(52) U.S. Cl. ........................ 156/66; 156/256; 53/138.7; 53/139.4

(58) Field of Search ............................ 156/60, 66, 256; 53/138.6–138.8

(56) References Cited

U.S. PATENT DOCUMENTS

| | | | |
|---|---|---|---|
| 3,534,520 | A | 10/1970 | Moran |
| 3,825,039 | A | 7/1974 | Crabb |
| 3,890,190 | A | 6/1975 | Eburn, Jr. |
| 3,895,989 | A | 7/1975 | Lucas |
| 3,919,829 | A | 11/1975 | Burford et al. |
| 4,420,355 | A | 12/1983 | Saur |
| 4,490,960 | A | 1/1985 | Klemesrud |
| 4,559,766 | A | 12/1985 | Matsushita |
| 4,559,977 | A | 12/1985 | Dilley |
| 4,586,412 | A | 5/1986 | Johnson |
| 4,655,264 | A | 4/1987 | Dilley |
| 4,660,351 | A | 4/1987 | Saitoh |
| 4,696,244 | A | 9/1987 | Sampson et al. |
| 4,730,434 | A | 3/1988 | Knudsen |
| 5,045,042 | A | 9/1991 | Rutledge |
| 5,121,682 | A | 6/1992 | Parker et al. |
| 5,389,190 | A | 2/1995 | Larsen et al. |
| 5,402,619 | A | 4/1995 | Nelson |

*Primary Examiner*—Sam Chuan Yao
(74) *Attorney, Agent, or Firm*—Caesar, Rivise, Bernstein, Cohen & Pokotilow, Ltd.

(57) ABSTRACT

A device and method of use for applying twist-ties onto flexible packages on an assembly line. Each package has a front panel including an exterior surface. Each twist-tie is a strip of material having a first face. The apparatus comprises a glue applicator (e.g., a spray head), a supply (e.g., reel) of twist-tie material, a carrier (e.g., channel shaped head including magnets), and a package support (e.g., conveyor). The package support holds each package at a first station in an orientation whereupon the exterior surface of the front panel is oriented vertically. The carrier is arranged to be oriented in a first horizontal position for receipt of a respective twist-tie thereon so that the first face of the twist-tie is facing upward. The glue applicator applies glue (e.g., sprays hot glue) downward onto the first face of the twist-tie as it is advanced onto the carrier. The carrier is pivotable to a position so that the glued first face of the twist-tie is oriented in a vertical plane facing the exterior surface of the front panel of the package and is then movable in a horizontal direction to carry the twist-tie into engagement with the exterior surface of the front panel of the package to fixedly secure the twist-tie thereon. The carrier includes an air jet to aid in the release of the twist-tie from the magnetic holding of the carrier. The carrier is then brought back to its original position for receipt of another glue-bearing twist-tie thereon.

9 Claims, 11 Drawing Sheets

METHOD FOR APPLYING TWIST-TIES TO FLEXIBLE PACKAGES

RELATED APPLICATIONS

This application is a Divisional of our earlier filed U.S. patent application Ser. No. 09/734,121, filed on Dec. 11, 2000 now U.S. Pat. No. 6,453,967, entitled Compound Motion Apparatus and Method for Applying Twist-Ties to Flexible Packages, whose disclosure is incorporated by reference herein, and which is assigned to the same assignee as the subject invention.

BACKGROUND OF THE INVENTION

This invention relates generally to apparatus for making flexible packages, and more particularly to apparatus for applying twist-ties to reclosable, flexible packages.

Various types of flexible packages for holding particulate materials, e.g., ground or whole bean coffee, cereals, cookies, etc., have been disclosed in the patent literature and are commercially available today. "Twist-ties" (sometimes also referred to as "tin-ties") are frequently incorporated into such packages to enable the packages to be reclosed for multiple serving usage. In particular, such twist-ties are elongated strips commonly made of either plastic and wire or paper and wire, with the wire being embedded in the plastic or paper. The twist-tie is fixedly secured on one of the panels of the package adjacent the package's mouth. After the mouth of the package has been opened and some of the package's contents removed, the package can be reclosed by folding or rolling the upper end (the mouth) of the package about the twist-tie, with the ends of the twist-tie extending beyond the margins of the rolled/folded portion. The ends of the twist-tie can then be bent or folded over the rolled/folded mouth to prevent it from unrolling/unfolding, thereby keeping the mouth closed to prevent air from reaching the remaining contents in the package.

Heretofore the application and securement of a twist-ties to poly-laminate or other material flexible packages on an assembly line has been accomplished in several ways. For example, in one way an applicator is used to apply, e.g., spray, hot glue to one face of a strip of twist-tie material while the strip is held in vertical plane on a wheel or disk arranged to be rotated about a horizontal axis. Once the glue has been applied to the twist-tie the disk is rotated 90 degrees to carry the twist-tie with its adhesive-bearing face directed toward a horizontally oriented flexible package (e.g., bag) onto which it is to be secured. The bag is then pressed against the glue-bearing twist-tie. This method of applying twist-tie to a flexible package is shown in U.S. Pat. No. 5,389,190 (Larsen et al.).

A second way of applying a twist-tie to flexible packages on an assembly line is to apply, e.g., spray, the hot glue directly to a preselected area on each bag while the bag is held in a vertical plane. Then the twist-tie can be pressed onto the bag in the area bounded by the applied glue.

Both of such methods of application suffer from one or more drawbacks. For example, the disadvantage of applying glue to the twist-tie on a disk and then rotating the disk, as described above, is that the glue is applied from a horizontal direction onto a vertically oriented twist-tie strip. Accordingly, the force of gravity tends to pull the hot glue downward and away from (off) the twist-tie strip as the strip is carried into a horizontal orientation for application to a horizontally oriented bag. If there are inconsistencies in the glue material, the application of the glue to the twist-tie becomes unreliable, resulting in misapplication of the twist-tie to the package.

The disadvantages of applying glue directly to the bag while the bag is held in a vertical orientation and then pressing the twist-tie against the glue-bearing area on the bag is three-fold. First, since the glue is applied from a horizontal direction onto a vertically oriented bag, the force of gravity will also act to pull the glue downward and away from (off) the area of the bag to receive the twist-tie strip. If there are inconsistencies in the glue material, the application of the glue to the twist-tie bearing portion of the bag becomes unreliable, resulting in misapplication of the twist-tie to the bag, as well as "stringing" of residual glue between the glue applicator head and the bag, thereby resulting in an off-quality bag (i.e., a bag with glue extending out beyond the margins of the twist-tie). The second disadvantage of this method of twist-tie application is that since the bag is formed of a flexible material, e.g., a polylaminate, if the bag flexes between the glue application and the twist-tie application, the twist-tie may not be placed onto the glue strip. The third disadvantage is that if the bag is missing on the conveyor or other device for carrying the bags to the glue head and the glue head is activated, then the hot glue can be dispensed into the machine, resulting in reliability and safety issues.

Examples of other apparatus for applying twist-ties to packages are found in the following U.S. Pat. Nos. 3,534,520 (Moran), 3,825,039 (Crabb), 3,890,190 (Eburn, Jr. et al.), 3,895,989 (Lucas), 3,919,8290 (Burford et al.), 4,420,355 (Saur), 4,490,960 (Klemestrud), 4,559,766 (Matsushita), 4,559,977 (Dilley), 4,586,412 (Johnson), 4,655,264 (Dilley), 4,660,351 (Saitoh), 4,696,244 (Sampson et al.), 4,730,434 (Knudsen), 5,045,042 (Rutledge), 5,121,682 (Parker et al.) and 5,402,619 (Nelson et al.).

SUMMARY OF THE INVENTION

These and other objects of the instant invention are achieved by providing apparatus and a method for applying twist-ties to a flexible packages. Each package comprises a front panel including an exterior surface. Each of the twist-ties comprises a strip of material having a first and a second opposed faces.

The apparatus basically comprises a glue applicator, a supply of twist-tie material, a carrier, and a package support. The package support is arranged to hold the package at a first station in an orientation, whereupon the front panel of the package is oriented in a vertical plane. The carrier has a twist-tie receiving face and is arranged to be oriented in a first position, wherein its twist-tie receiving face is in a horizontal plane. The supply of twist-tie material is arranged to sequentially provide respective twist-ties to the twist-tie receiving face of the carrier so that the first face of each respective twist-tie is facing upward. The glue applicator is disposed above the carrier and arranged for applying glue downward onto the upwardly facing first face of each respective twist-tie.

The carrier is pivotable to a second position after the glue is applied to the first face of the twist-tie, wherein the first face of the twist-tie is oriented in a vertical plane facing the exterior surface of the front panel of the package on the package support at the first station. The carrier is also movable in a horizontal direction to carry the twist-tie with the glue on its first face into engagement with the exterior surface of the front panel of the package to fixedly secure the twist-tie thereon.

DETAILED DESCRIPTION OF THE PREFERRED EMBODIMENT

Figure 1:
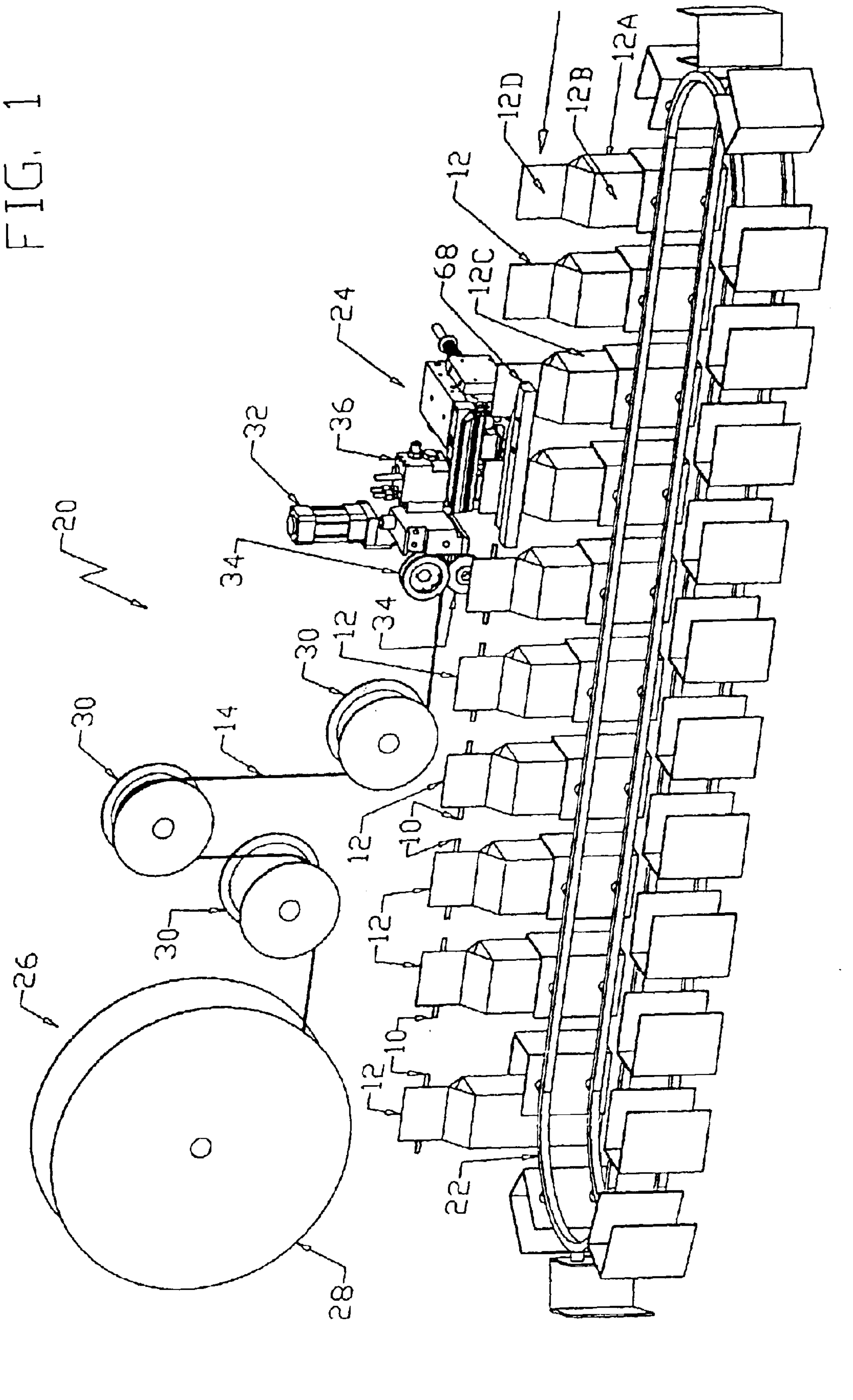
FIG. 1 is an isometric view of a portion of one exemplary twist-tie applying apparatus constructed in accordance with this invention for adhesively securing twist-ties onto flexible packages, e.g., bags, on an assembly line basis.
Figure 5A:
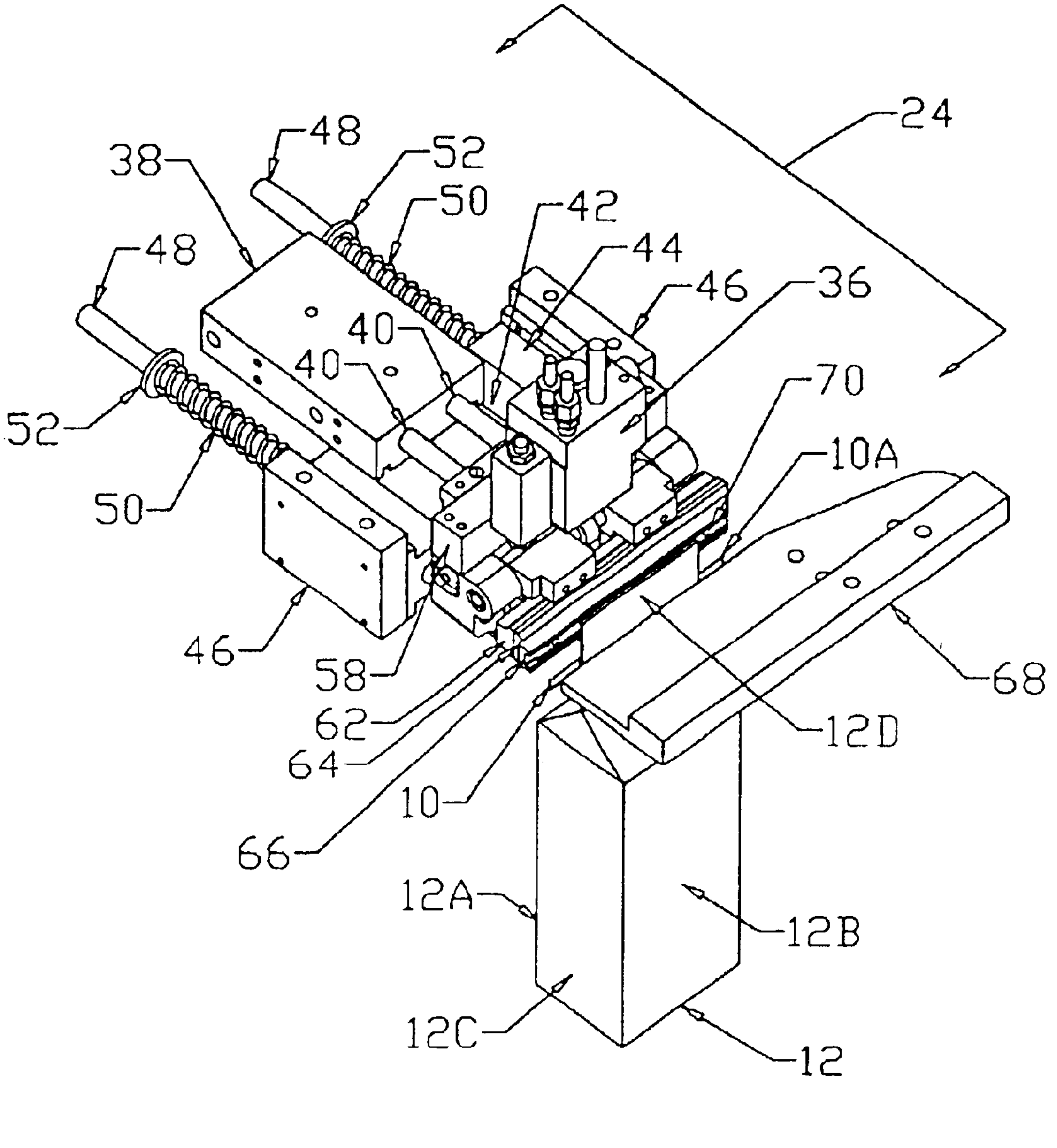
FIG. 5A is an isometric view of the portion of the apparatus of FIG. 1 showing the apparatus after the carrier has been retracted, leaving the twist-tie adhesively secured to the bag.
Figure 5B:
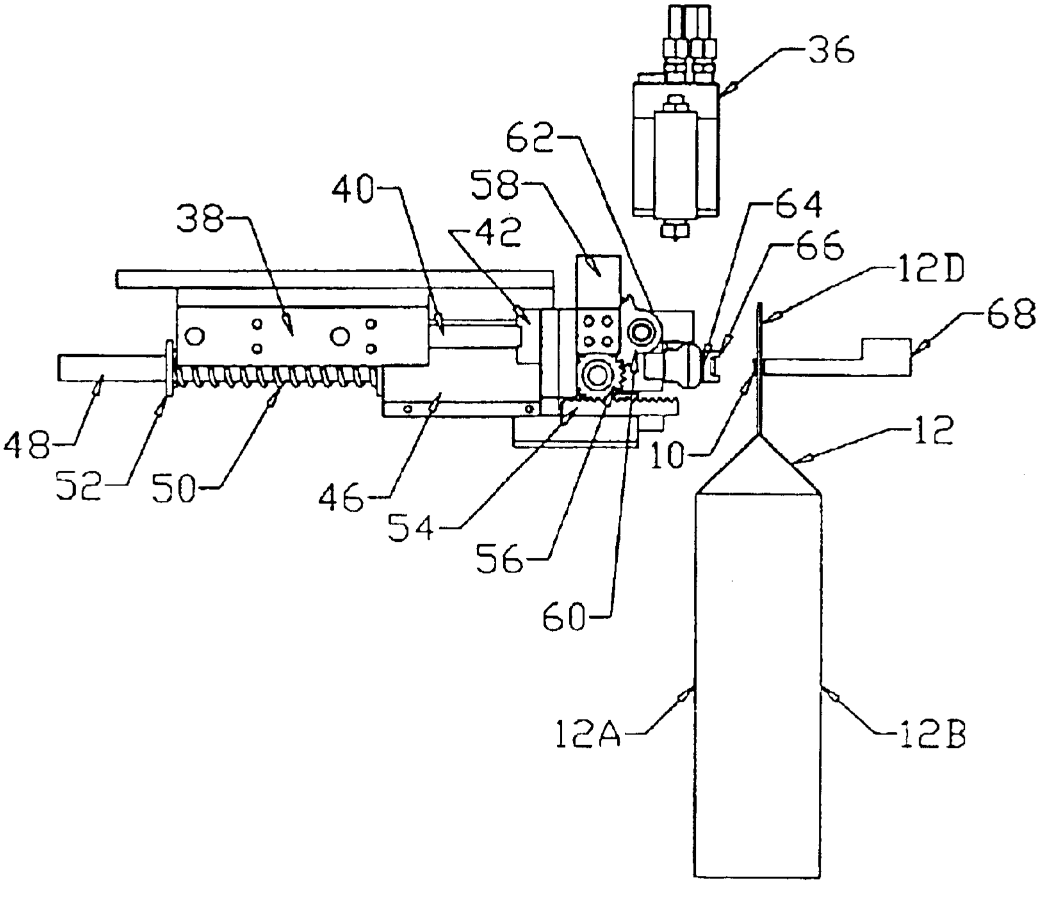
FIG. 5B is a side elevational view of the portion of the apparatus shown in FIG. 5A, but with a portion of the apparatus removed for clarity.

Referring to FIG. 1, there is shown at 20 in FIG. 1 one exemplary embodiment of an apparatus constructed in accordance with this invention for applying twist-ties 10 onto flexible packages 12. Before discussing the apparatus 20, a brief discussion of the construction of the twist-tie 10 is in order. To that end each twist-tie is of conventional construction, e.g., it comprises a ribbon-like web of material, such as plastic or paper, having a pair of wires or other deformable members extending along the web's respective marginal edges and embedded in the plastic or paper material. Being a ribbon-like web, the twist-tie includes an opposed pair of faces 10A and 10B (FIG. 5B). In accordance with a preferred embodiment of this invention the wires making up the twist-tie are steel or some other material that is attracted to a magnet to expedite the holding of the twist-tie in place on a magnetic carrier head (to be described later) forming a portion of the apparatus 20.

As can be seen in FIG. 1, the apparatus 20 basically comprises a conveyor 22 for carrying a plurality of flexible packages, e.g., bags, 12 one-by-one in the direction of the arrow shown in that figure to an applicator unit or assembly 24 at which a respective twist-tie 10 is applied to the package. The applicator assembly will be described in detail later. Suffice it for now to state that it includes the heretofore identified magnetic carrier head. Associated with the applicator assembly 24 is a twist-tie supply assembly 26. The twist-tie supply assembly 26 basically comprises a reel 28 of ribbon-like material 14 for making respective twist-ties therefrom and plural rollers 30 for carrying the ribbon-like material 14 to a knife assembly 32 where it is cut into respective predetermined lengths to form respective twist-ties 10. In particular, the ribbon-like material 14 is pulled from the reel 28, deposited on the magnetic carrier head of the applicator assembly 24 by a pair of drive rollers 34. The drive rollers 34 are located adjacent the upstream side of the applicator assembly 24 to pull the leading portion of the web of material 14 in a horizontal plane, with a face of the ribbon-like material facing upward onto the magnetic carrier head. The knife assembly 32 is located downstream of the drive rollers 34 and immediately upstream of the magnetic carrier head of the applicator assembly 24 to sever the leading end of the ribbon-like material 14 deposited on the carrier head at a predetermined point from the free end thereof to complete the formation of the twist-tie 10 on the carrier head. The length of the twist-tie, i.e., the distance between its free ends, is preferably greater than the width of the bag onto which it is to be applied, as is conventional. In the embodiment shown each bag 12 includes a front panel 12A, a rear panel 12B, a pair of gusseted side panels 12C and a flanged, sealed top 12D.

A glue applicator 36, e.g., a hot-melt glue spray head, is located downstream of the knife assembly 36 and above the upstream end of the carrier head to spray a single stream of hot melt glue onto the upwardly directed face of the ribbon-like material 14 as it is fed onto the carrier head. The glue spray head 36, along with the other components of the apparatus, such as the knife assembly, the conveyor, etc., is controlled by an electrical controller (not shown) so that the spray head starts depositing of the glue on upper face of the material 14 at a predetermined distance from the leading end of the material 14 (i.e., what will be the leading end of the twist-tie 10 to be made) and stops depositing the glue a predetermined distance from the point at which the material 14 is severed by the knife assembly 32 (i.e., what will be the trailing end of the twist-tie 10). In particular, the apparatus is arranged so that the glue is applied to the central portion of the twist-tie for a length equal to approximately the width of the front panel, i.e., the distance between the two opposed gusseted side panels 12C. The upper face of the material 14 to which the glue is applied becomes the face 10A of the twist-tie 10 and is the face that becomes adhesively secured to the exterior surface of the top flange portion 12D of the front panel 12A of the package 12. When secured, as will be described later, the twist-tie is centered on the package so that its free ends extend a short distance beyond the marginal edges of the flanged top 12D, as is conventional.

Figure 2A:
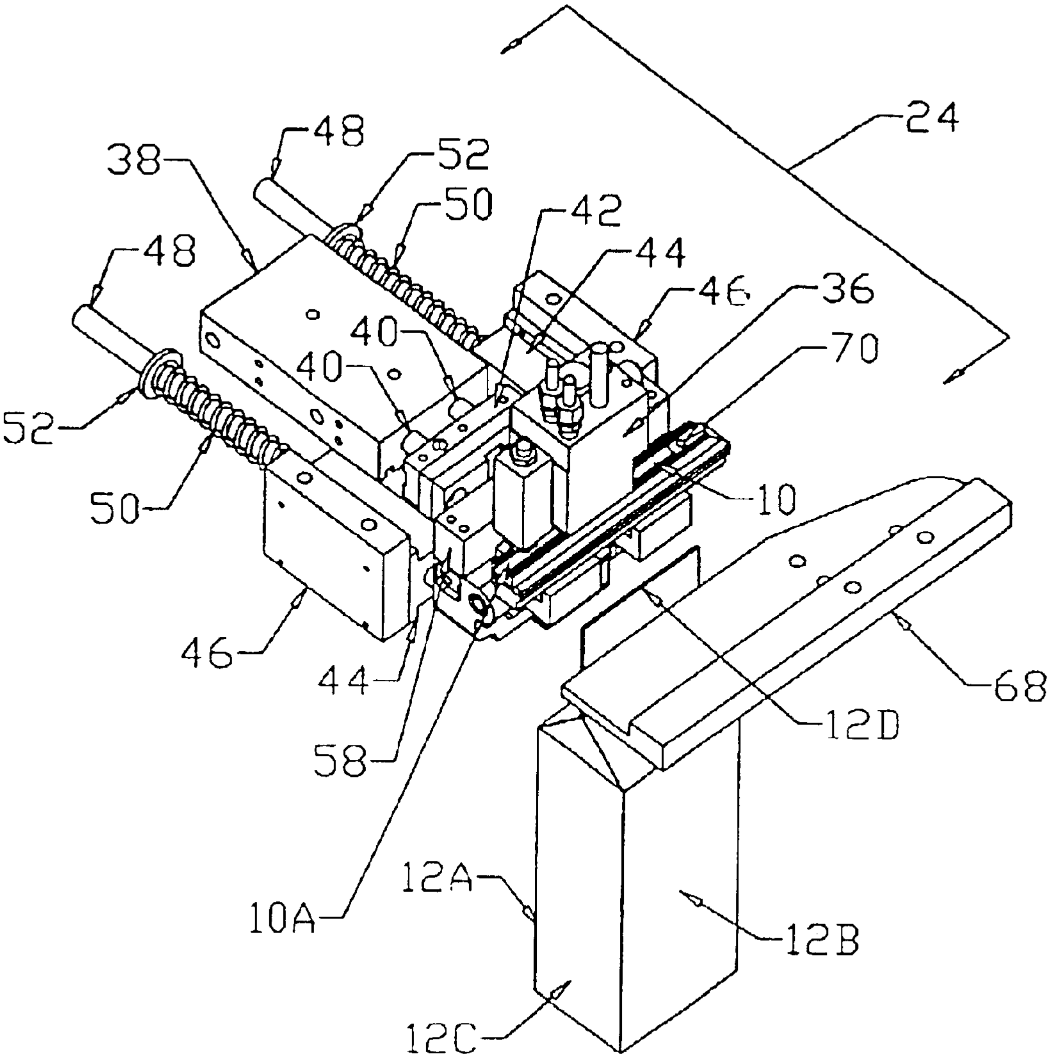
FIG. 2A is an isometric view of the portion of the apparatus of FIG. 1 showing the apparatus after a twist-tie has had glue applied to its exposed (upwardly directed) surface and has been delivered to a carrier of the apparatus for application to a bag.
Figure 2B:
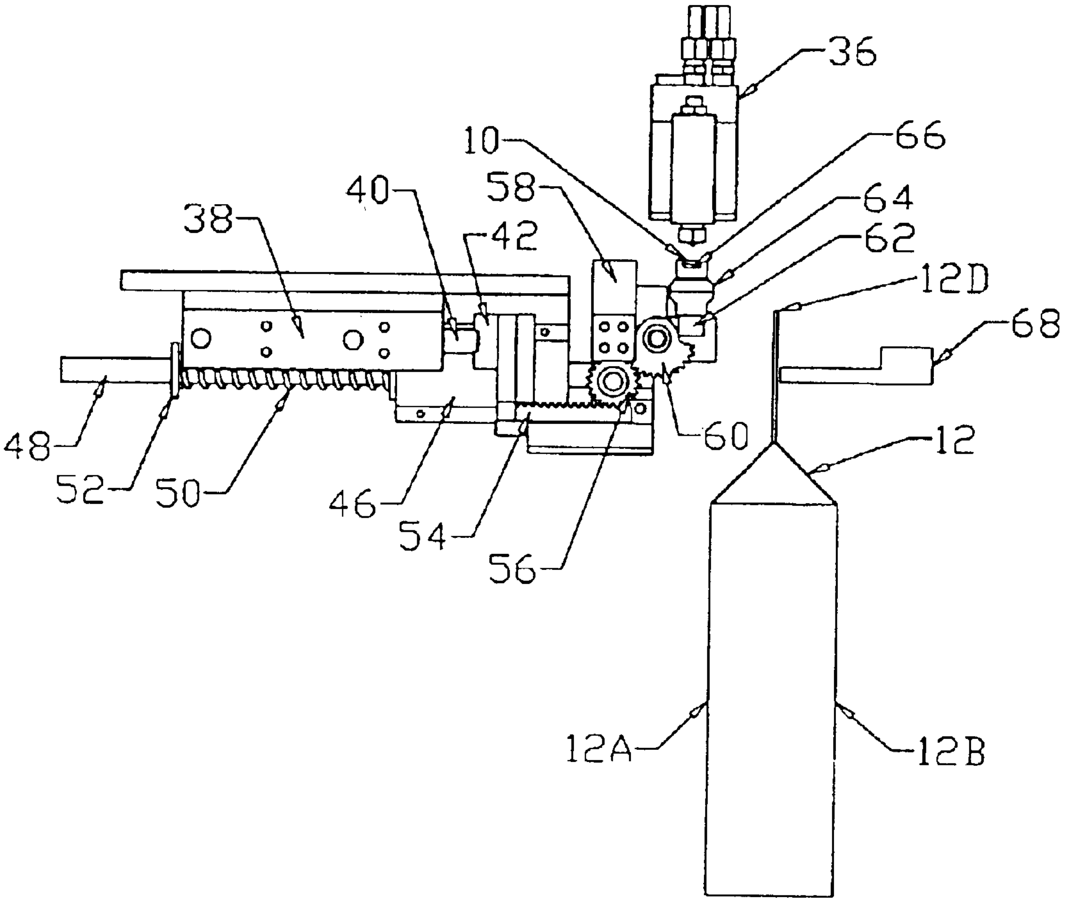
FIG. 2B is a side elevational view of the portion of the apparatus shown in FIG. 2A, but with a portion of the apparatus removed for clarity.

Referring now to FIGS. 2A and 2B it can be seen that the applicator assembly 24 includes a solenoid controlled, dual-rod, pneumatic cylinder 38. The cylinder includes a pair of rods 40 coupled to the piston (not shown) in the pneumatic cylinder. Each rod 40 has a free end on which a block 42 is mounted. The dual-rod cylinder 38 is itself mounted on a support plate, which also supports two blocks 46 to which a pair of linear bearings 44 are mounted. A pair of guide rods 48 extend into respective ones of the linear bearings 46. A coil spring 50 is interposed between one linear bearing 46 and a stop washer 52 on one of the guide rods and a similar coil spring is interposed between the other linear bearing and a stop washer on the other guide rod. The coil springs are compression springs which are loaded slightly to bias the carrier head in the normal or retracted "home" position shown in FIGS. 2A and 2B so that the carrier head is away from the flange of the bag on which the twist-tie is to be adhesively secured.

A rack gear 54 is fixedly mounted on a lower portion of the block 42 and projects horizontally therefrom. The rack gear has plural teeth extending upward along its top edge which intermesh with plural teeth disposed around the periphery of an idler gear 56. The idler gear is mounted on a main housing 58. The main housing 58 serves to pivotably mount the magnetic carrier thereon, as will be described later. The idler gear 56 is mounted on a shaft that extends through a bearing (not shown) within the main housing 58. Also mounted on the main housing 58 is a sector gear 60. The sector gear is mounted on a shaft (not shown) extending through a pivotable support member 62. The idler gear's teeth engage the teeth of the sector gear 60.

The heretofore mentioned magnetic carrier head, now designated by the reference number 64, is mounted on the pivotable support member 62. The carrier head 64 basically comprises a an elongated channel-shaped member having a slot or channel 66 extending along its upper surface between a pair of upwardly directed marginal flanges. When the dual rod cylinder is in its retracted (home) position, the bottom of the channel 66 of the carrier head is in a horizontal plane, slightly lower in elevation than the plane of the incoming ribbon-like material for forming the twist-tie.

Figure 6A:
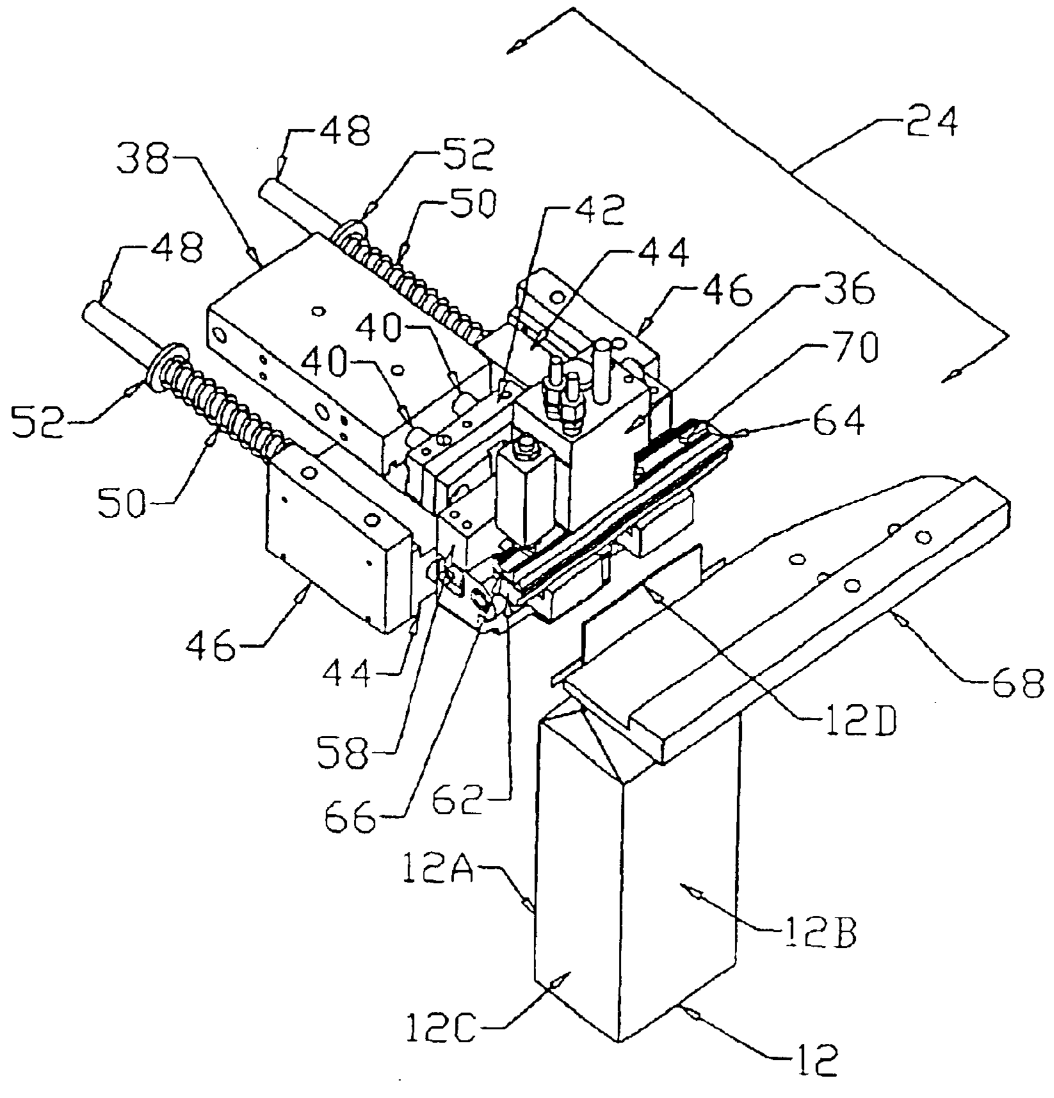
FIG. 6A is an isometric view of the portion of the apparatus of FIG. 1 showing the apparatus after the carrier has been pivoted back to its home position ready for receipt of another twist-tie thereon.

The leading edge of the carrier head's channel 66 is chamfered (See FIGS. 5A and 6A) to facilitate the introduction of the free end of the ribbon-like material 14 therein during the formation of the twist-tie as described above. Plural magnets (not shown) are located within the carrier head below the channel 66. The magnets serve to magnetically attract the wires of the twist-tie to hold the twist-tie in place within the channel 66.

The channel-shaped carrier head 64 is mounted on the support member 62 so that when the carrier head is in its normal, retracted or "home" position, as shown in FIG. 2A, the channel 66 faces upward. Accordingly, the surface 10A of the twist-tie bearing the glue applied by the glue spray head 36 also faces upward and is disposed horizontally. The glue spray head is mounted so that its single stream or jet of glue is directed from its nozzle onto the upper surface 10A of the twist-tie, but not onto the carrier's flanges on either side of the channel 66.

As can be seen in FIGS. 1, 2A and 2B, the apparatus 20 also includes an anvil 68 located immediately to the side of the conveyor 22 opposite to the carrier head. The anvil is an elongated member having a planar front face and is mounted on a support (not shown) so that its front face is at the height at which the magnetic carrier member holding the glue-bearing twist-tie is extended into contact with the exterior surface of the top flange 12D of the package 12.

Figure 3A:
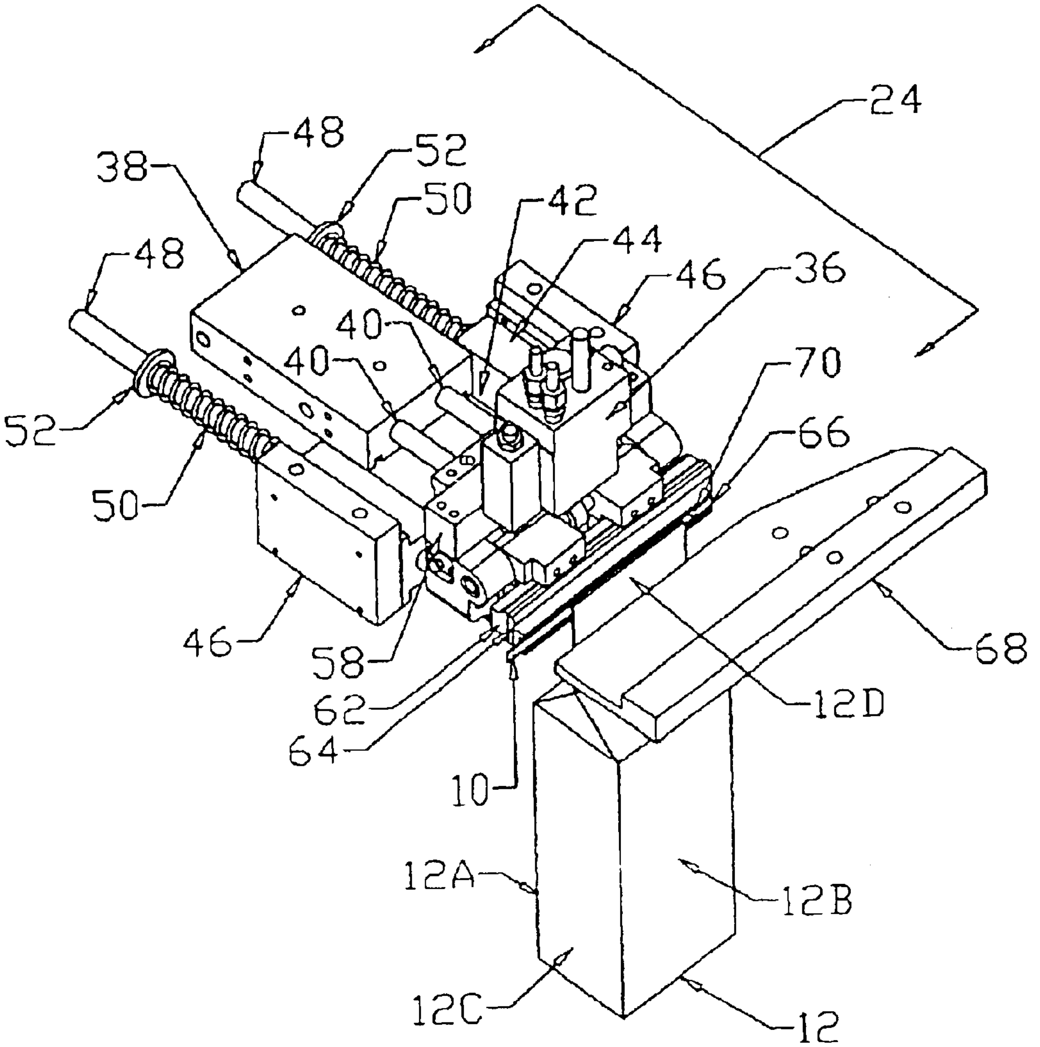
FIG. 3A is an isometric view of the portion of the apparatus of FIG. 1 showing the apparatus after the twist-tie with the glue applied to its exposed surface has been pivoted to a position opposite the bag onto which it is to be adhesively secured.
Figure 3B:
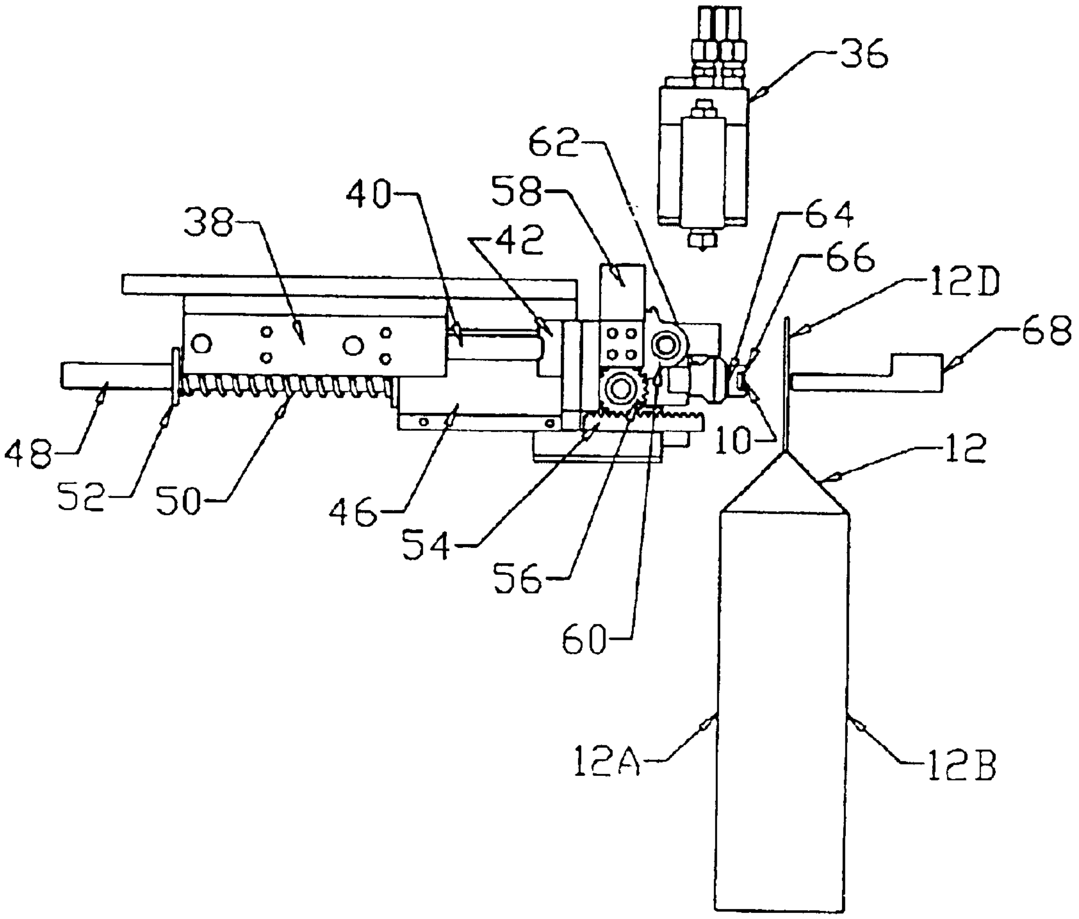
FIG. 3B is a side elevational view of the portion of the apparatus shown in FIG. 3A, but with a portion of the apparatus removed for clarity.

Once the twist-tie 10 has had glue applied to its upper face 10A and is residing in the channel 66 of the carrier head 64, with the carrier's channel disposed in a horizontal plane facing upward, like that shown in FIG. 2A, the apparatus is ready to be pivoted to orient the twist-tie into a vertical position for application onto the exterior surface of the front face of the flanged top of the bag. To that end, as can be seen in FIG. 3B, the piston in the pneumatic cylinder is operated to cause the two rods 40 to extend outward (to the right in FIGS. 3A and 3B) carrying the block 42 with them. Since the rack gear 54 is mounted on the block 42, the rack gear also moves outward (to the right). The loading on the coil springs 50 surrounding the guide rods 48 prevents the guide rods from moving into their respective linear bearings 46, while also preventing the main housing 58 from moving with the rack gear 54. The outward movement of the rack gear 54 causes the counterclockwise rotation of the idler gear 56, which in turn causes the clockwise rotation of the sector gear 60. This action pivots the carrier support member 62 and the magnetic carrier head 64 mounted thereon ninety degrees from its normal or home position (shown in FIGS. 2A and 2B) to the vertical orientation shown in FIGS. 3A and 3B.

Because the main housing is mounted on the spring loaded guide rods and pressure is applied by the springs in the opposite direction of the motion of the cylinder's rods 40, the first portion of the extension of the block 42 does not push the main housing 58 closer to the bag 10. Instead, this first 30%–50% of the cylinder's stroke translates the rack gear relative to the idler gear. As described above this results in a rotary motion of the carrier head, 90° of rotation, (clockwise as seen from the right side of the applier) until the mechanism reaches its mechanical stop, i.e., the block 42 contacts the main housing 58.

Since the twist-tie is held magnetically within the channel 66 by the magnets of the carrier head, the pivoting of the carrier head to the vertical orientation will not result in the twist-tie falling out or otherwise being displaced during that movement. The carrier head is prevented from pivoting beyond 90° by virtue of the fact that the block 42 engages the main housing 58 when the head is at the vertical orientation shown in FIGS. 3A and 3B. At this point, the carrier head with the twist-tie magnetically held within the channel is located opposite the anvil 68 with the flange 12D of the package 12 interposed therebetween and with the adhesive surface 10A of the twist-tie 10 facing the exterior surface of the front panel portion of the flange 12D.

Figure 4A:
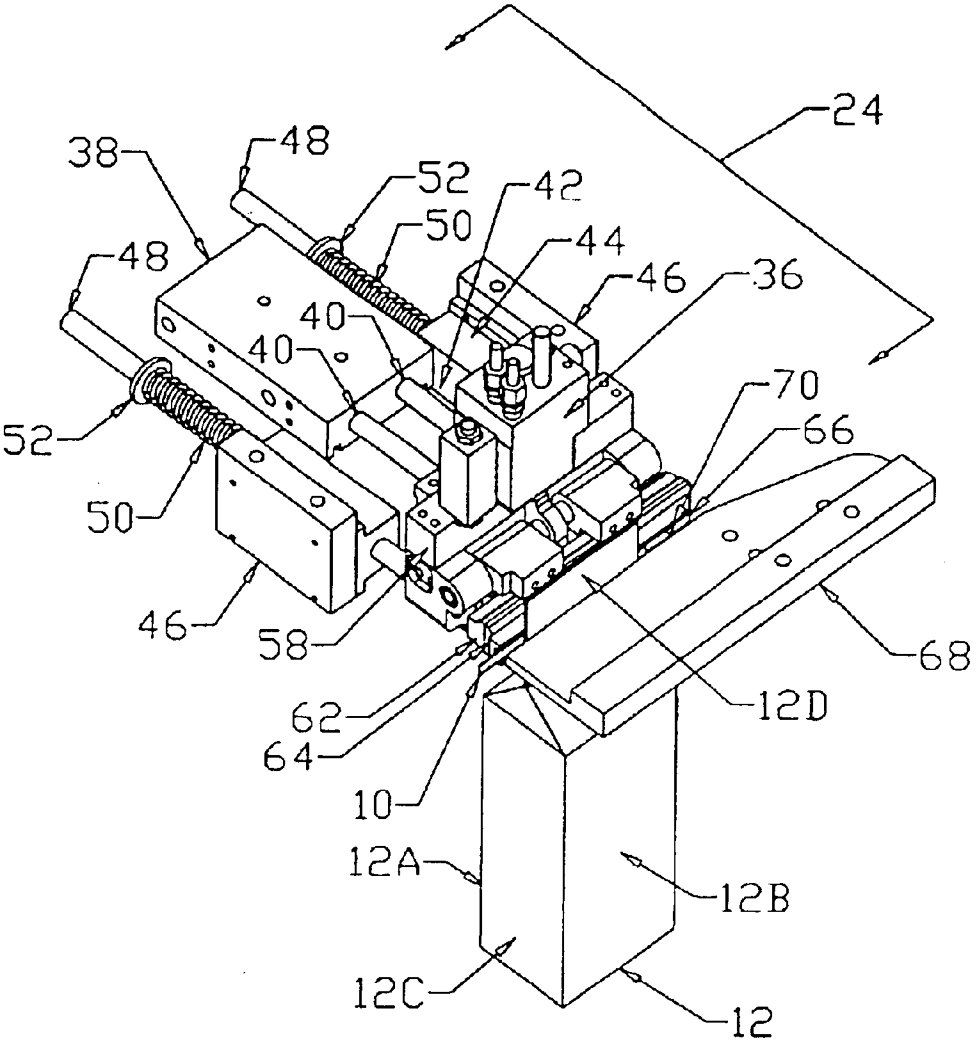
FIG. 4A is an isometric view of the portion of the apparatus of FIG. 1 showing the apparatus after the carrier bearing the glue-bearing twist-tie has been extended into the position wherein the glued surface of the twist-tie is in intimate engagement with a portion of the bag to adhesively secure the twist-tie to the bag.
Figure 4B:
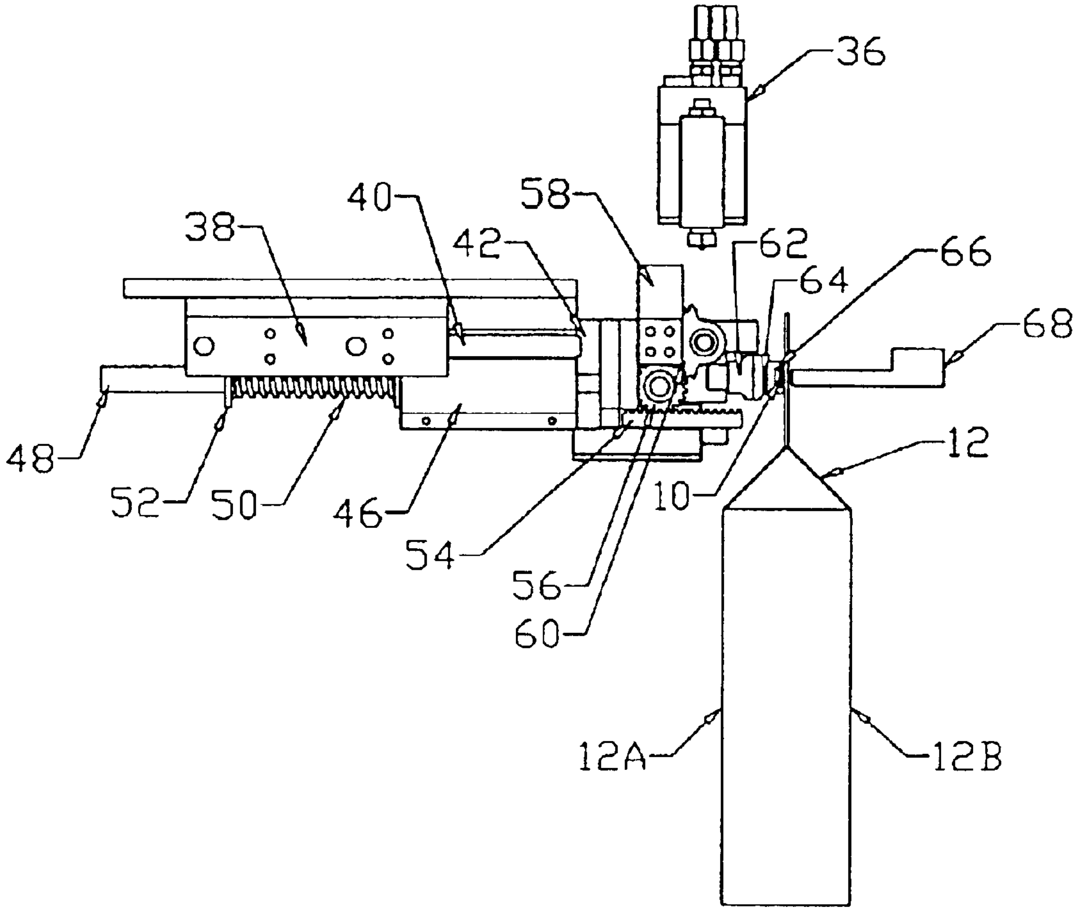
FIG. 4B is a side elevational view of the portion of the apparatus shown in FIG. 4A, but with a portion of the apparatus removed for clarity.

Continued operation of the pneumatic cylinder carries the rods 40 with the block 42 mounted thereon further outward, but the result of this final 50%–70% of the cylinder's stroke is the linear extension of the main housing and the carrier head mounted thereon. In particular, the continued operation of the cylinder causes the two guide rods 48 to begin moving through their respective linear bearings 46 since the block 42 cannot move any further due to its contact with the main housing 58. Accordingly, the two coil springs 50 begin to compress between their respective linear bearings 46 and their stop washers 52 on the guide rods 48. This action moves both the block 42 and the main housing 48 toward the exterior surface of the package's flange 12D as shown in FIGS. 4A and 4B, thereby carrying the adhesive-bearing twist-tie in the carrier head 64 into contact with that portion of the exterior surface of the top flange of the package. The assembly 24 is arranged so that at the maximum extent of the extension of the carrier head 64, the adhesive surface 10A of the twist-tie 10 intimately engages the exterior surface of the flange 12D, with the anvil's front face serving as a backstop. Accordingly, the twist-tie is effectively adhesively secured to the exterior surface of the bag's top flange at the front panel, with the marginal ends of the twist-tie extending beyond those marginal edges. Once the twist-tie is brought into engagement with the bag 12, as just described, the apparatus 20 is arranged to be retracted under the automatic control of the controller. In particular, after a predetermined apply time, a solenoid valve (not shown) for the dual rod cylinder 38 is de-energized, and the cylinder's piston begins to retract. Because the springs 50 are under compression, the main housing 58 and the carrier head 64 mounted thereon retracts along with the cylinder's piston. This operation is shown in FIGS. 5A and 5B and will be described hereinafter. However, before doing that, it should be noted that in order to ensure that the twist-tie is released from its magnetic engagement within the carrier head's channel 66 when the carrier head is to be retracted, the carrier head 64 includes a plurality of air jet ports 70 (FIGS. 1, 2B, 3B, 4B and 5B) located therein. The air jet ports 70 are in communication with a source of compressed air (not shown) which is operated automatically by the controller (not shown) to produce an air blast to facilitate ejection of the twist-tie from the carrier head. The air blast remains energized from the time the twist-tie is pressed onto the bag until well after the carrier head has begun retracting.

The retraction of the carrier head is accomplished by providing air into the pneumatic cylinder 38 in an opposite direction from that provided to extend the carrier head toward the bag, to cause the cylinder's internal piston to move the rods guide rods 48 in the opposite direction from that described heretofore, i.e., right to left as shown in FIGS. 5A and 5B. This opposite air pressure, along with the bias provided by the compressed springs 50, carries the main housing 58 and the guide member support 64 with it back towards its retracted position, whereupon the springs 50 return to their natural position as shown in FIGS. 5A and 5B. This action leaves the twist-tie 10 adhesively secured on the exterior surface of the bag's flange 12D, with the opposed ends of the twist-tie extending beyond the marginal edges of the flange as best seen in FIG. 5A.

Figure 6B:
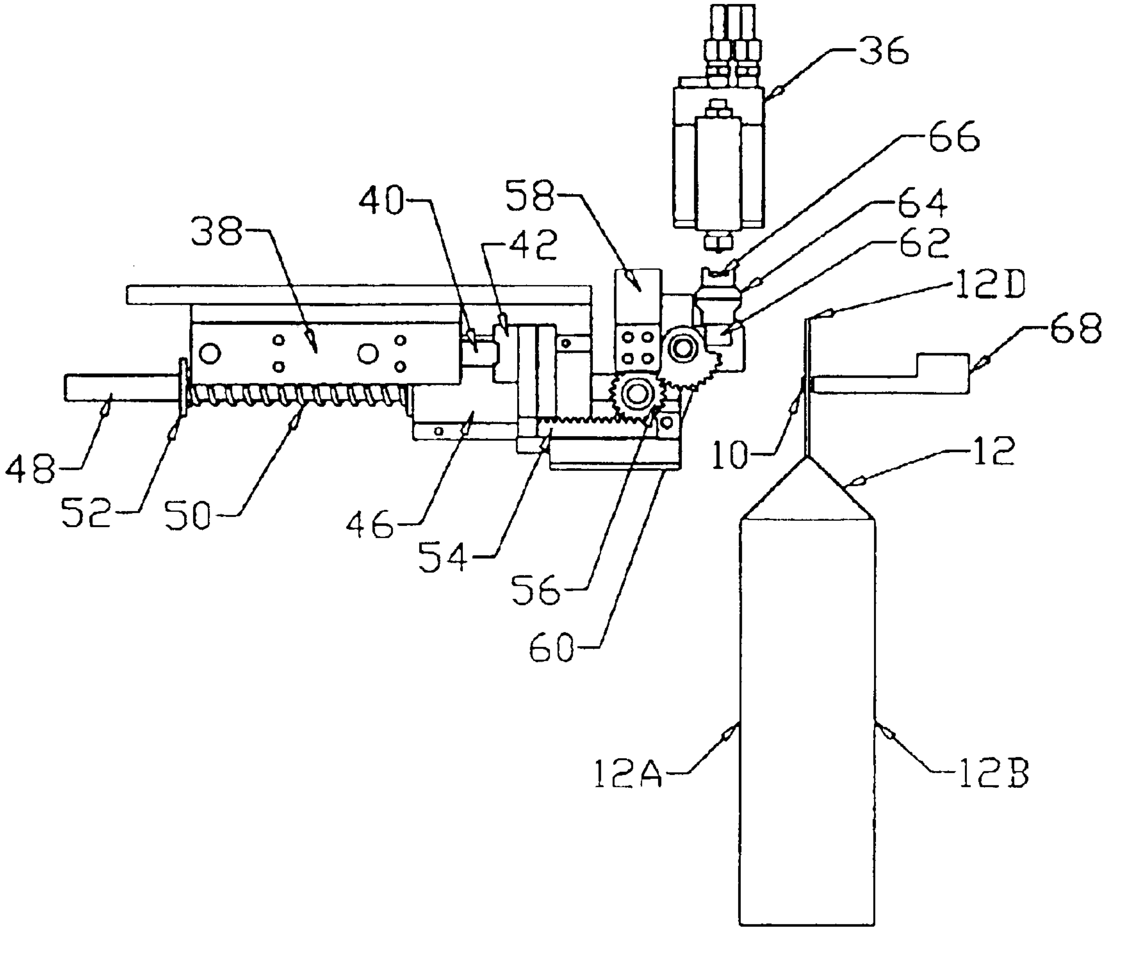
FIG. 6B is a side elevational view of the portion of the apparatus shown in FIG. 6A, but with a portion of the apparatus removed for clarity.

Continued retraction of the piston in the pneumatic cylinder 38 carries the block 42 away from the main housing 48, whereupon the rack gear 54 is carried away from the main housing 58. This action causes the idler gear 56 to rotate clockwise, which in turn causes the sector gear 60 to rotate counterclockwise, thereby bringing the carrier head back to its home position, i.e., horizontal orientation, under the glue spray head 36 as shown clearly in FIGS. 6A and 6B.

The conveyor 22 is then operated by the controller to carry the package 12 with the twist-tie 10 adhesively secured to it from station at which the twist-tie applicator assembly 24 is located and to bring the next successive package to that station so that its flange is located adjacent the anvil and the carrier head for application of a twist-tie to that package.

As should be appreciated from the foregoing the apparatus and method of this invention offer various advantages over the prior art. In particular, the application of glue directly downward from a glue applying, e.g., spray, head onto a horizontally disposed twist-tie has the advantage that inconsistencies in the glue material have little or no effect on the glue application since gravity actually helps to pull the glue onto the twist-tie. Moreover, since the glue is applied directly to the twist-tie, alignment between the twist-tie and glue stripe is ensured.

As should be appreciated by those skilled in the art, the various components making up the system 20 are merely exemplary of numerous components that could be used in the system, e.g., a hydraulic cylinder or an electrically operated linear motor could be used to move the carrier head. The carrier head need not include magnets or have airfits, etc.

Without further elaboration the foregoing will so fully illustrate our invention that others may, by applying current or future knowledge, adopt the same for use under various conditions of service.

We claim:

1. A method of for applying twist-ties to flexible packages, each package comprising a front panel including an exterior surface, each of the twist-ties comprising a strip of material having a first and a second opposed faces, said method comprising:

(A) locating a package at a predetermined position wherein the exterior surface of the front panel of the package is oriented in a generally vertical plane;

(B) providing a twist-tie in a horizontal plane with said first face directed upward;

(C) applying glue downward from above said first face of the twist-tie onto said first face of the twist-tie;

(D) pivoting the twist-tie into a vertical plane adjacent the package;

(E) carrying the twist-tie in a horizontal direction so that said glue on said first face of the twist-tie engages a portion of the exterior surface of the package to secure the twist-tie thereto.

2. The method of claim 1 additionally comprising the step of:

(F) sequentially providing respective packages to said predetermined position, so that each package will have a twist-tie adhesively applied thereto.

3. The method of claim 1 wherein the glue is applied to the twist-tie as the twist-tie is extended onto a horizontally oriented carrier.

4. The method of claim 3 wherein said method comprises the steps of pivoting the carrier into an orientation wherein said first face of the twist-tie is in a vertical plane and then moving the carrier in a horizontal direction to bring the glued first face of the twist-tie into engagement with the exterior surface of the package.

5. The method of claim 4 wherein the carrier is moved horizontally away from the package after the twist-tie has been secured thereto and is pivoted back to a horizontal orientation for receipt of another twist-tie thereon.

6. The method of claim 1 wherein each twist-tie includes at least one wire therein and wherein said method comprises magnetically holding said twist-tie on said carrier.

7. The method of claim 6 additionally comprising the step of providing a blast of gas to the twist-tie on the carrier to aid in the release of the twist-tie from the magnetic holding of the carrier and the securement of the twist-tie to the exterior surface of the front panel of the package.

8. The method of claim 1 additionally comprising the step of:

(F) providing a continuous strip of twist-tie material and a severing respective portions of said continuous strip to form respective twist-ties.

9. The method of claim 1 wherein said method comprises providing a conveyor for carrying a plurality of packages one at a time to said predetermined position.

* * * * *